United States Patent
Subramanian et al.

(10) Patent No.: US 7,567,859 B2
(45) Date of Patent: Jul. 28, 2009

(54) METHODS AND APPARATUSES FOR CONTROL OF BUILDING COOLING, HEATING AND POWER CO-GENERATION SYSTEMS

(75) Inventors: Dharmashankar Subramanian, New Hope, MN (US); Anoop K. Mathur, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 707 days.

(21) Appl. No.: 11/001,221

(22) Filed: Dec. 1, 2004

(65) Prior Publication Data

US 2006/0116789 A1    Jun. 1, 2006

(51) Int. Cl.
G05D 17/00   (2006.01)
G05B 15/02   (2006.01)
G05B 11/01   (2006.01)
G05B 13/02   (2006.01)
G01R 11/56   (2006.01)

(52) U.S. Cl. ............... 700/288; 700/9; 700/14; 700/16; 700/22; 700/28; 700/36; 700/275; 700/286; 700/291; 700/297; 705/412

(58) Field of Classification Search ............ 700/9, 700/14, 16, 19, 22, 28, 36, 275–277, 287–288, 700/291, 297, 286; 703/18; 705/412
See application file for complete search history.

(56) References Cited

U.S. PATENT DOCUMENTS

| | | | |
|---|---|---|---|
| 4,604,714 A * | 8/1986 | Putman et al. ............ | 700/288 |
| 4,613,952 A | 9/1986 | McClanahan | |
| 4,921,163 A | 5/1990 | Viessmann | |
| 5,159,562 A | 10/1992 | Putman et al. | |
| 5,216,623 A | 6/1993 | Barrett et al. | |
| 5,244,146 A | 9/1993 | Jefferson et al. | |
| 5,432,710 A * | 7/1995 | Ishimaru et al. ............ | 705/412 |
| 5,621,654 A * | 4/1997 | Cohen et al. ............ | 700/287 |
| 5,692,676 A | 12/1997 | Walker | |
| 5,754,424 A | 5/1998 | Melvin | |
| 5,794,446 A | 8/1998 | Earley et al. | |
| 5,841,652 A | 11/1998 | Sanchez | |
| 6,088,688 A | 7/2000 | Crooks et al. | |
| 6,129,284 A | 10/2000 | Adams et al. | |
| 6,216,956 B1 | 4/2001 | Ehlers et al. | |
| 6,263,260 B1 | 7/2001 | Bodmer et al. | |
| 6,278,899 B1 | 8/2001 | Piche et al. | |
| 6,314,413 B1 | 11/2001 | Otte | |
| 6,317,638 B1 | 11/2001 | Schreder et al. | |

(Continued)

OTHER PUBLICATIONS

U.S. Department of Energy, How Does It Work? Absorption Chillers, From the pages of the Energy Matters Newsletter, 2 pages, Fall 2003.

(Continued)

Primary Examiner—Sean P Shechtman

(57) ABSTRACT

A control system and method for achieving economic operation of CHP systems. A plurality of factors, including power source prices and operational needs, are assessed using multiple strategies. The solutions achieved by each strategy are compared, and the best performing strategy is selected. The solution can then be implemented. The assessment of factors and strategies can be updated periodically. A further embodiment includes a method of designing a CHP system using similar methods applied to simulated or estimated future loads and costs.

22 Claims, 16 Drawing Sheets

U.S. PATENT DOCUMENTS

| | | | |
|---|---|---|---|
| 6,366,889 B1 | 4/2002 | Zaloom | |
| 6,381,504 B1 | 4/2002 | Havener et al. | |
| 6,591,620 B2 * | 7/2003 | Kikuchi et al. | 62/126 |
| 6,757,591 B2 | 6/2004 | Kramer | |
| 2002/0082747 A1 * | 6/2002 | Kramer | 700/276 |
| 2003/0125843 A1 * | 7/2003 | Prasad | 700/291 |
| 2004/0102924 A1 | 5/2004 | Jarrell et al. | |

OTHER PUBLICATIONS http://www.advancedbuildings.org/main_t_heat_gasfired_chiller.htm, "Gas-fired Chiller/Heaters", 2 pages, prior to filing date of present application.

* cited by examiner

METHODS AND APPARATUSES FOR CONTROL OF BUILDING COOLING, HEATING AND POWER CO-GENERATION SYSTEMS

FIELD

The present invention is related to the field of control systems. More particularly, the present invention is related to control methods and apparatuses for cooling, heating, and power (CHP or cogeneration) systems.

BACKGROUND

The availability of various alternatives for producing electricity, cooling, and heating enables a plurality of solutions to a given facility's needs. For example, there are available gas turbines and steam generators that may be used singly or in combination to produce electricity, and that generate byproduct thermal output (e.g., steam). Absorption chillers represent another advance, as they enable the production of a cooling fluid by using steam to create compression rather than electricity as used by conventional compressors.

The ready availability of natural gas and electric power supplies (as well as other power sources) to large scale facilities presents an opportunity for improved economics. In particular, it has become possible for a plant to adjust its reliance on each in light of changing prices. For example, a given plant may include a boiler system for providing heat using natural gas, coal or other fuel, a gas or fuel oil turbine for producing electricity, an absorption chiller for providing cooling, an electric compressor for providing cooling, and a connection to an electric grid for providing electricity purchased from a power plant. Such systems are known as cogeneration systems or, alternatively, CHP (cooling, heating, power) systems. The use of CHP systems presents an opportunity to modulate the amounts of electricity and fuel that are purchased and used for plant operations. However, control of such systems is complicated by their size and the plurality of factors that change over time, including maximum and minimum capacities, efficiencies, thermal and power loads, and prices. A stable and efficient control system is desired.

SUMMARY

The present invention, in an illustrative embodiment, includes a control system and method for achieving economic operation for a CHP system. A plurality of factors, including power source prices, usage costs, and operational needs, are assessed using multiple strategies. The solutions achieved by each strategy are compared, and the best performing strategy is selected. The solution can then be implemented. The assessment of factors and strategies can be updated periodically. In another embodiment, a CHP system is designed by estimating the costs of various CHP system configurations using various equipment combinations using these assessments of factors and strategies.

DETAILED DESCRIPTION

The following detailed description should be read with reference to the drawings. The drawings, which are not necessarily to scale, depict illustrative embodiments and are not intended to limit the scope of the invention.

As used herein, usage costs include non-fuel or non-power costs of using a CHP system component. These costs may include, for example, maintenance and cleaning costs, and parts and materials costs for items used to maintain components. Some illustrative parts and material costs include replacement parts (such as belts and bushings) and useable fluids (such as lubricants and refrigerant fluids). Usage costs can also include consideration of the expected lifetime of a component, for example, a gas powered generator may be expected to operate for a certain number of hours before requiring a major overhaul or replacement, with the costs of replacement pro-rated into usage costs. Usage costs may be considered in several illustrative embodiments, and the determination of how comprehensive usage costs are can be made by individual users. For example, labor costs associated with maintenance may be omitted by some users due to the need to have maintenance personnel available on-site for other purposes.

Figure 1:
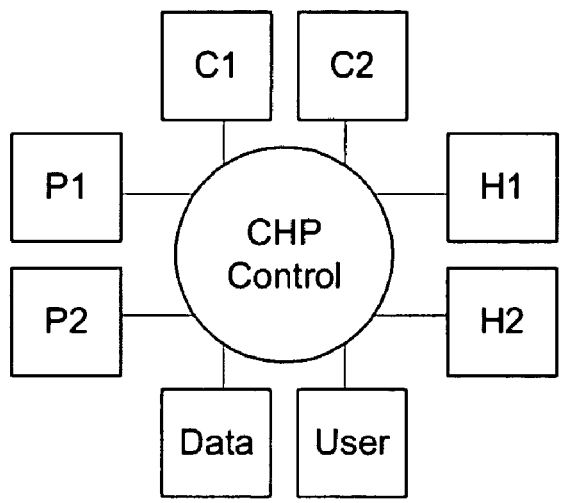
FIG. 1 is a high level schematic for a CHP system.

FIG. 1 is a high level schematic for a CHP system. The system may include multiple electricity sources P1, P2, multiple cooling sources C1, C2, and multiple heat sources H1, H2. The electricity sources P1, P2 may include, for example, a connection to an electric power grid, a gas turbine, a steam generator, or some other local electric power source such as a gasoline fired generator. The cooling sources C1, C2 may include, for example, an absorption chiller and an electric chiller. The heating sources H1, H2 may include, for example, an electric heating system, one or more forced air systems, or a boiler system (either steam or hot water, or both).

It should be noted that in some embodiments, complex industrial facilities are managed. For example, an industrial facility may require some rooms or buildings to be heated simultaneous to a requirement that other rooms or buildings be cooled. A bottling facility, where heating may be needed throughout much of the plant during cold weather, while cooling of a warehouse is simultaneously desired, is one example. Thus, conditions may call for simultaneous operation of both thermal heating and cooling systems.

The Control block controls the utilization of the electricity sources P1, P2, the cooling sources C1, C2, and the heat sources H1, H2. The Control block operates in response to Data inputs and User inputs. For example, the Data inputs may include information related to the cost of electricity and natural gas to enable the Control block to select an economical solution. In some embodiments, economic considerations may further include the cost of emissions credits. In some embodiments, the Data inputs further include, for example, information related to the efficiency, capacity, usage costs and/or availability of any of the components P1, P2, C1, C2, H1, H2. The User inputs may include thermostat settings, occupancy levels, and/or anticipated needs for heat/cooling/electricity. The User inputs (which in some embodiments are considered Data inputs) may include options for modifying conditions or adjusting preferences. For example, a system component may be deselected or disabled for maintenance purposes.

Figure 2:
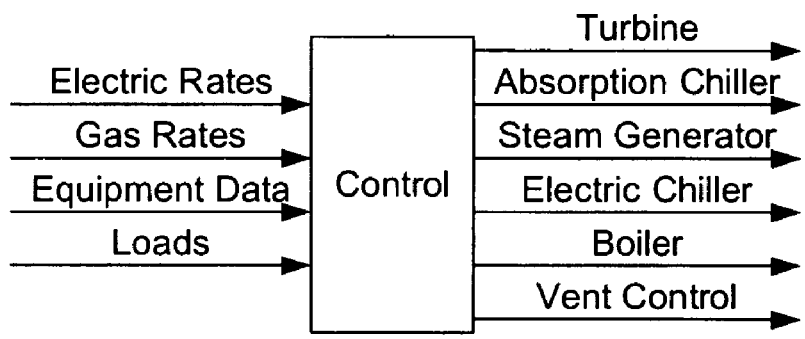
FIG. 2 is a block diagram for an illustrative embodiment.

FIG. 2 is a block diagram for an illustrative embodiment. The controller takes several pieces of data to formulate a solution based on several defined strategies, and provides output signals to operate various system components. More particularly, in the illustrative embodiment of FIG. 2, the controller observes several factors which may include electric rates, gas rates, equipment efficiency/capacity data, equipment usage cost data, and system loads, formulates a solution, and provides signals for operating a turbine, an absorption chiller, a steam generator, an electric chiller, and a boiler.

The various components may operate in a cooperative fashion. For example, if electric rates are high enough that, given the cost of gas and the efficiency of the turbine, electricity can be more cheaply generated locally, then the turbine is operated to provide electricity. If chilling is also needed, then steam produced by the turbine may be used by the absorption chiller to provide mechanical energy for a compressor used chill a cooling fluid that is then used to cool a building or other facility. If the absorption chiller cannot satisfy thermal needs, then an electric chiller may be used as well.

Alternatively, if heat is needed, the steam from electricity generation may be routed through heating pipes for heating purposes. In a further alternative, if more electricity is desired, the steam generator may use the steam from the turbine to produce more electricity, with the steam then potentially routed to heating pipes or the absorption chiller, exhausted, or recycled. The controller is adapted to select a most cost effective strategy for operating the various components. In different conditions, for example, calling for light electricity needs but significant heating, the boiler may be operated using gas, while grid electricity is used for electric power.

Any number of conditions may be theorized in the preceding manner, and solutions proposed on a case by case basis using intuitive understandings. However, for the present invention, a more systematic method of determining a solution is preferred and may be further explained by reference to FIGS. 4A-8C, which illustrate several example CHP solution strategies. These strategies may be incorporated into a method similar to that illustrated in FIG. 3.

Figure 3:
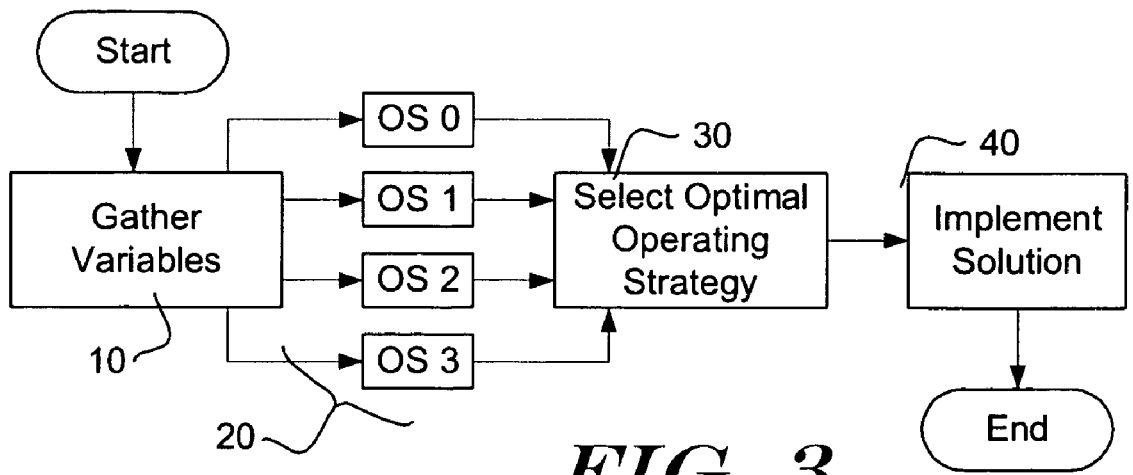
FIG. 3 is a block process diagram showing an illustrative method.

FIG. 3 shows a block process diagram for an illustrative method embodiment. From a start block, the method begins by gathering variables as shown at 10. The variables may include, for example, electric rates, fuel rates, equipment data (such as capacities, efficiency, and usage costs), and estimated electric and thermal loads. Next, a plurality of operating strategies are used to formulate solutions for present conditions and calculate the costs of each solution, as shown at 20. For the illustrative example, four operating strategies, OS0, OS1, OS2 and OS3 are used; a greater or lesser number of operating strategies may be used. Once the solutions and costs for each operating strategy are calculated at 20, the method continues with selecting the cheapest or otherwise optimal operating strategy, as shown at 30. With an operating strategy selected, the illustrative method continues with implementing the solution dictated by the selected strategy, as shown at 40. The method ends, as shown, and waits for a predetermined duration of time before starting again. For example, in some embodiments, the method is performed at hourly intervals.

The step of gathering variables, shown at 10, may further include the step of forecasting thermal load and/or power load. This forecast thermal/power load can then be used to configure the desired CHP strategy. Some variables that may be used include historical thermal/power loads, historical and forecast weather conditions, time of day, day type (weekend/weekday/holiday), etc. If desired, various parts of this data (prices, weather, etc.) may be downloaded from the Internet or other electronic source.

An additional consideration with respect to power costs is that power consumption can be priced in various ways. For example, RTP (real time pricing) enables power costs to vary throughout the day, with such information available, often, over the Internet or via another electronic service. If enabled by local utilities, pricing information may be downloaded via the Internet or other automated source for use by the controller. At least two forms of pricing are used at present, the first being consumption pricing based on total power consumption (typically in kilowatt-hours), and a second being demand pricing based on peak demand levels during a given time period (measured in kilowatts of use measured at peak usage). Each of these pricing methods may be considered. For example, if demand pricing is a likely concern, then a strategy producing a larger amount of electric power than is needed most of the time, yet using such electricity for operating an electric chiller (or, if so equipped, selling the electricity back to the local grid) most of the time, may be adopted. A further cost consideration may include an estimation of price changes. For example, hot, humid daytime weather may be an indication that RTP will rise due to increased demand, and so the prices may be further weighted to compensate for expected increases.

In some circumstances, system components limit the selection of operating strategy. For example, if a boiler has a minimum operating output at 25% of capacity, then a solution anticipating 7% operating variability during a time period relying on a median output for the boiler at 28% may be deselected, as the boiler cannot modulate itself low enough to provide a stable solution. Alternatively, given a critical operation in a plant, a solution may be selected where a minimum output is ensured. For example, even if electric costs are lower than fuel costs, a local generator may be operated at moderate capacity to assure that, in the event of grid failure, the local generator is already up and running. If desired, negative weather events may be anticipated as well. For example, if it is determined that a storm is approaching, the local turbine generator may be activated to avoid complete reliance on the power grid, which can be susceptible to interruption or failure during a storm. Such factors may be incorporated into the system as invariable inputs.

FIGS. 4A-8C illustrate operating strategies for use in an illustrative example embodiment. The labels given below to each illustrative operational strategy indicate, roughly, the prioritization of the solution approach. For example, a heat load following strategy generally operates in a manner where the predicted heat load for the facilities being powered is met first, and the electric, cooling, or other requirements of the facility are met once parameters for heating are set. These labels are merely provided for convenience and should not be construed as conveying further limitation.

Different solutions may be generated using each strategy at least in part because the components in use are effective for multiple tasks. For example, in an electric load following operational strategy, a turbine generator may be used to generate electricity if the electricity generated is cheaper than or approximates the cost of electricity which can be bought off the grid. This parameter may be set first to carry at least a portion of the electric load. As a secondary benefit, the steam released from the steam generator may be used for heating by piping the steam into another heat exchanger or to for cooling by using the steam in an absorption chiller.

As an example, the method shown in FIG. 3 may include the use of each of these following methods as OS0-OS3, and more than just four strategies may be selected for analysis. After estimating costs for an upcoming time period using each strategy, the cheapest strategy is then selected. Generally, the selection of exact parameters of operation can be performed during operation. For example, whether the turbine generator operates at 80 or 75 percent of its peak can be determined in response to actual loads. The system is placed in a condition where anticipated thermal and power loads can be met without requiring modification of the overall configuration except at intervals where the various loads and costs are analyzed as shown in FIG. 3. By setting certain parameters in advance and maintaining the configuration for a period of time, system stability is preserved, while the optimal solution is approached.

The illustrative operating strategies shown in FIGS. 4A-8C are disclosed herein for the purpose of showing a relatively thorough example of the present invention. The present invention is not limited to the use of these particular strategies, form of strategies, or system components. Instead, a relatively thorough illustrative example is given to provide an illustration for the understanding of those of skill in the art.

For several FIGURES an intuitive explanation of when a given method may be optimal is given. However, the many variables involved (including varying capacities and efficiencies for the system components) mean that, in operation, the intuitive explanation may not always apply. Further, the intuitive explanations generally rely on high/low prices or loads. Many times, the loads and prices will be "moderate" rather than high or low, rendering the intuitive explanations rather irrelevant. At these times, the present methods may be highly useful. The present invention, in contrast to an intuitive method, calculates anticipated costs and compares solutions regardless of intuitive understandings of the interplay of variables.

In one embodiment, during operation of a CHP system an estimation of cost savings over other methods may be maintained by observing output and usage levels for various components.

Within the following FIGURES, where a system component is not used or disabled, an X is placed across/through the component's representation. If a system component is "preferred" a box is placed around the component's representation.

Figure 4A:
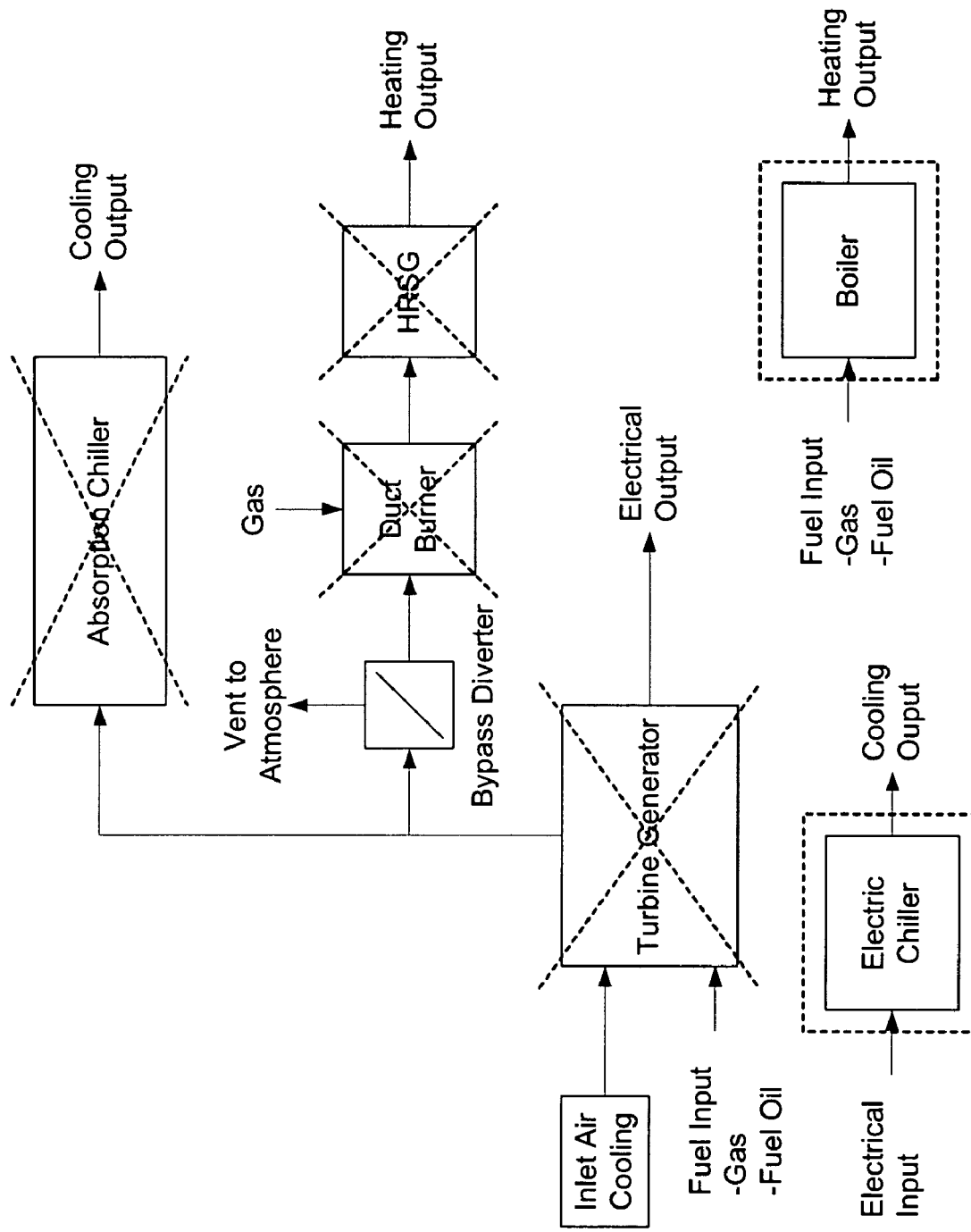
FIGS. 4A-4B illustrate operation during two simple operational strategies.
Figure 4B:
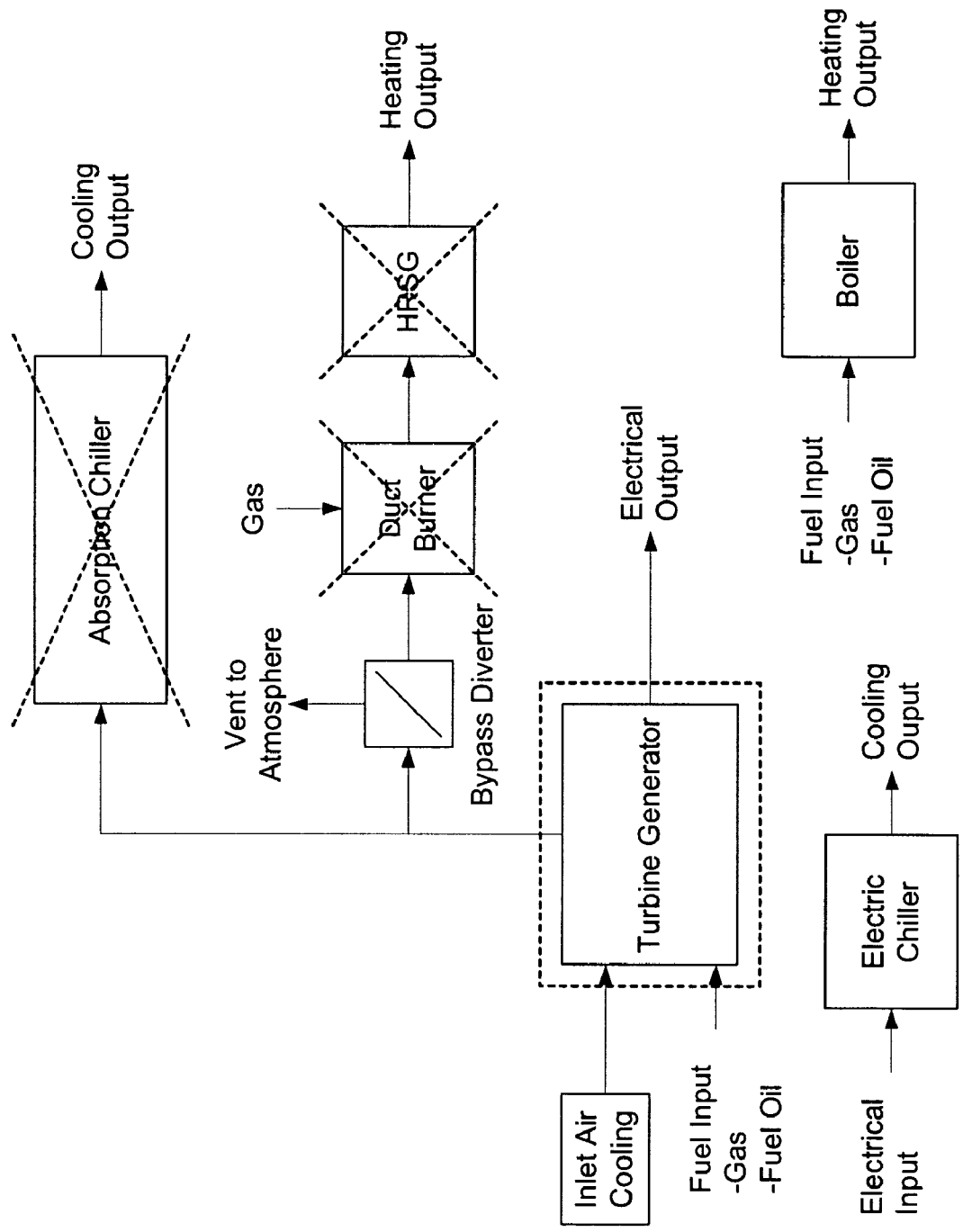

FIGS. 4A-4B illustrate operation during two simple operational strategies. FIG. 4A shows a turbine shutdown operation mode. As illustrated by several Xs, the turbine generator is shut down. In turn, this prevents operation of each of the exhaust driven absorption chiller and the heat recovery steam generator (HRSG). With the HRSG not operating, the duct burner is not needed and therefore is not used, either. Thermal control is provided using the electric chiller and the boiler. One might expect the method of FIG. 4A to be cheapest, for example, during periods corresponding to very high fuel prices and medium to low real time power (RTP) prices, when operation of the turbine may be economically unattractive.

FIG. 4B shows a full turbine, no heating or cooling example. The absorption chiller and HRSG are disabled, as shown by the Xs, and the duct burner is also off with the HRSG disabled. This mode may be cheapest at times where fuel prices are low (relative to RTP prices) and thermal loads are also low. For example, if the thermal loads are quite low, the minimum acceptable set points for the absorption chiller and HRSG may prevent operation of either component. The turbine may be operated at its fullest capacity. If desired, a further modification may allow operation of the turbine at a reduced capacity if the power load for the system is less than the maximum output of the turbine and where sale of power back to the local grid is unfeasible.

Figure 5A:
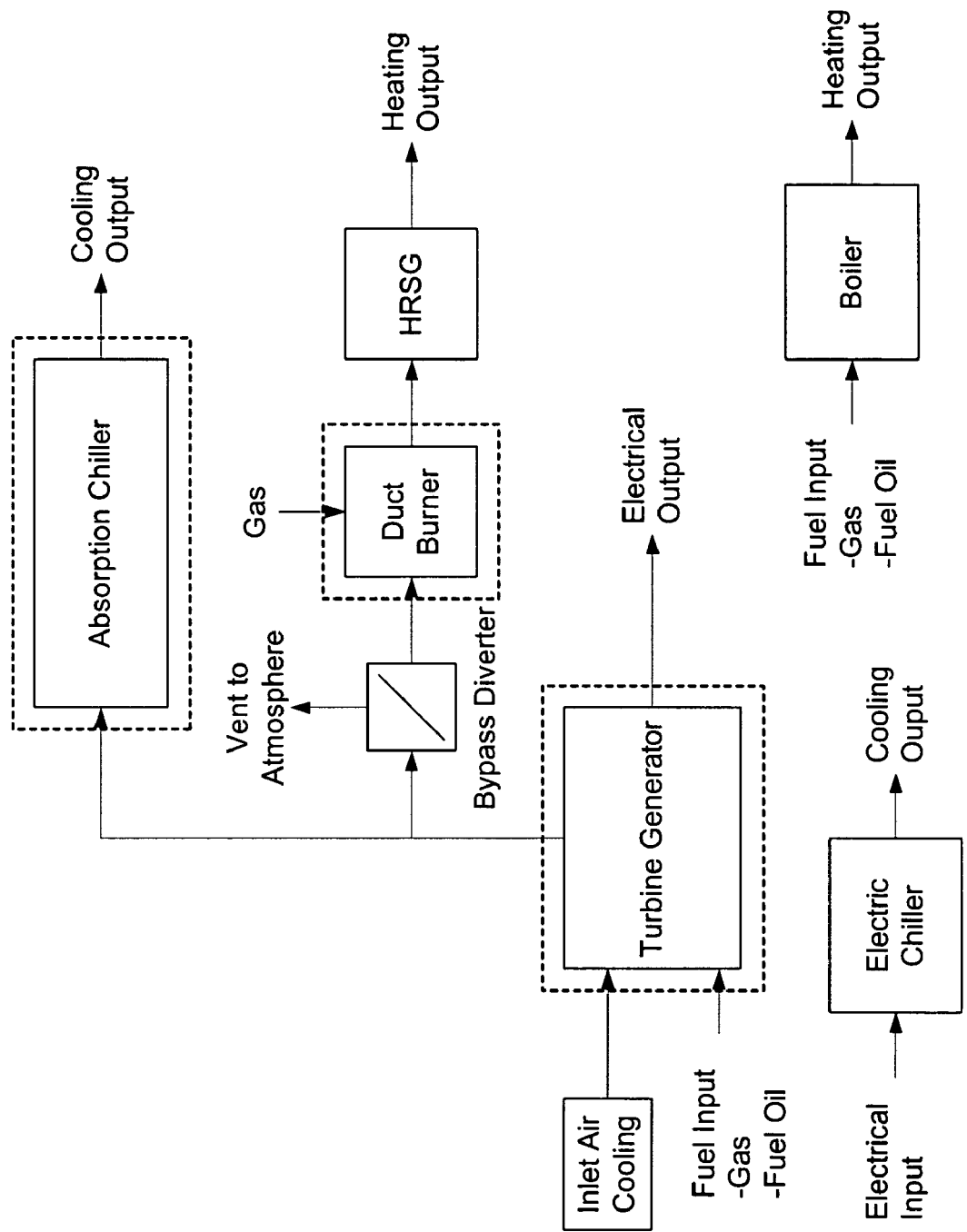
FIGS. 5A-5C illustrate operation during three cooling priority operational strategies.
Figure 5B:
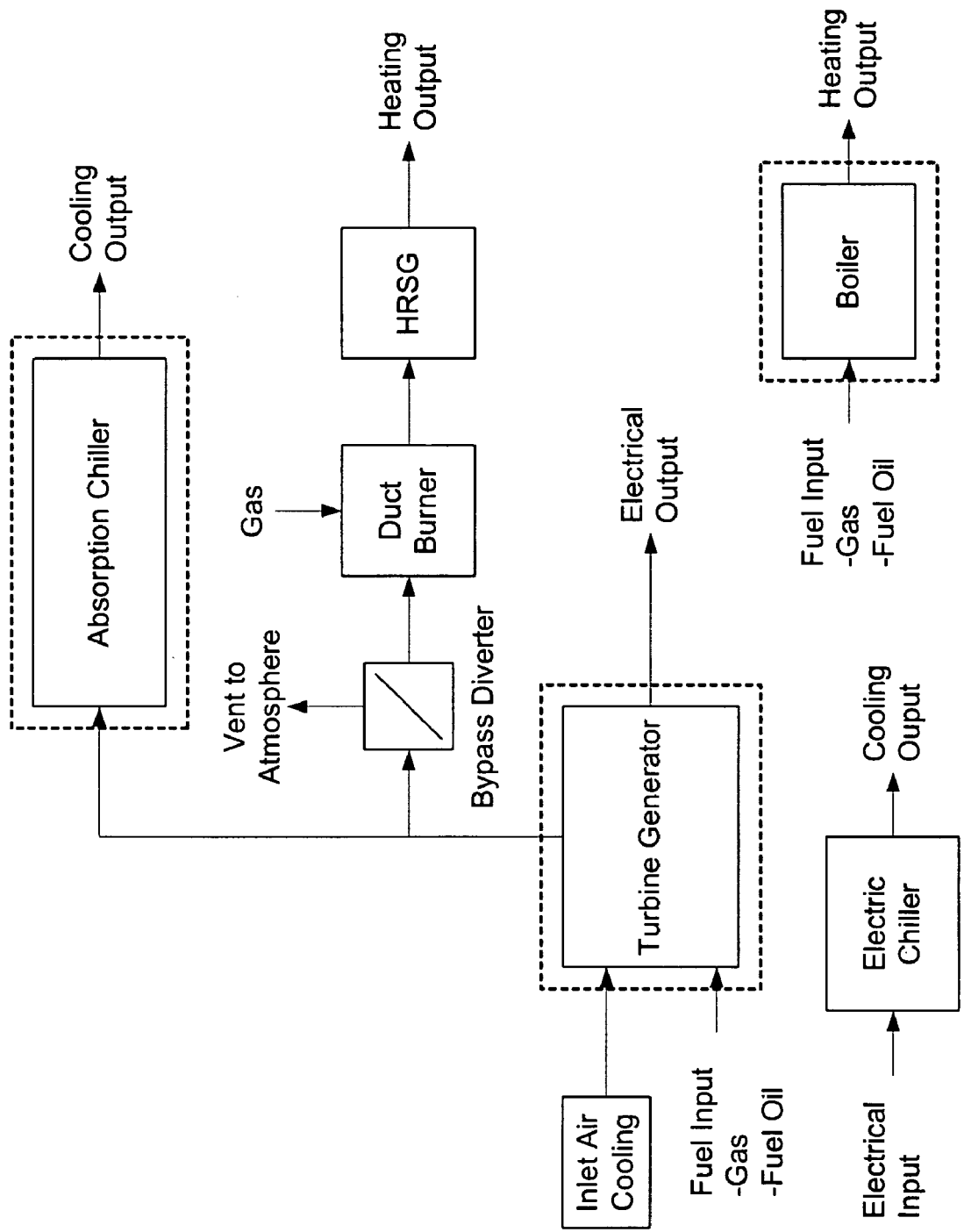
Figure 5C:
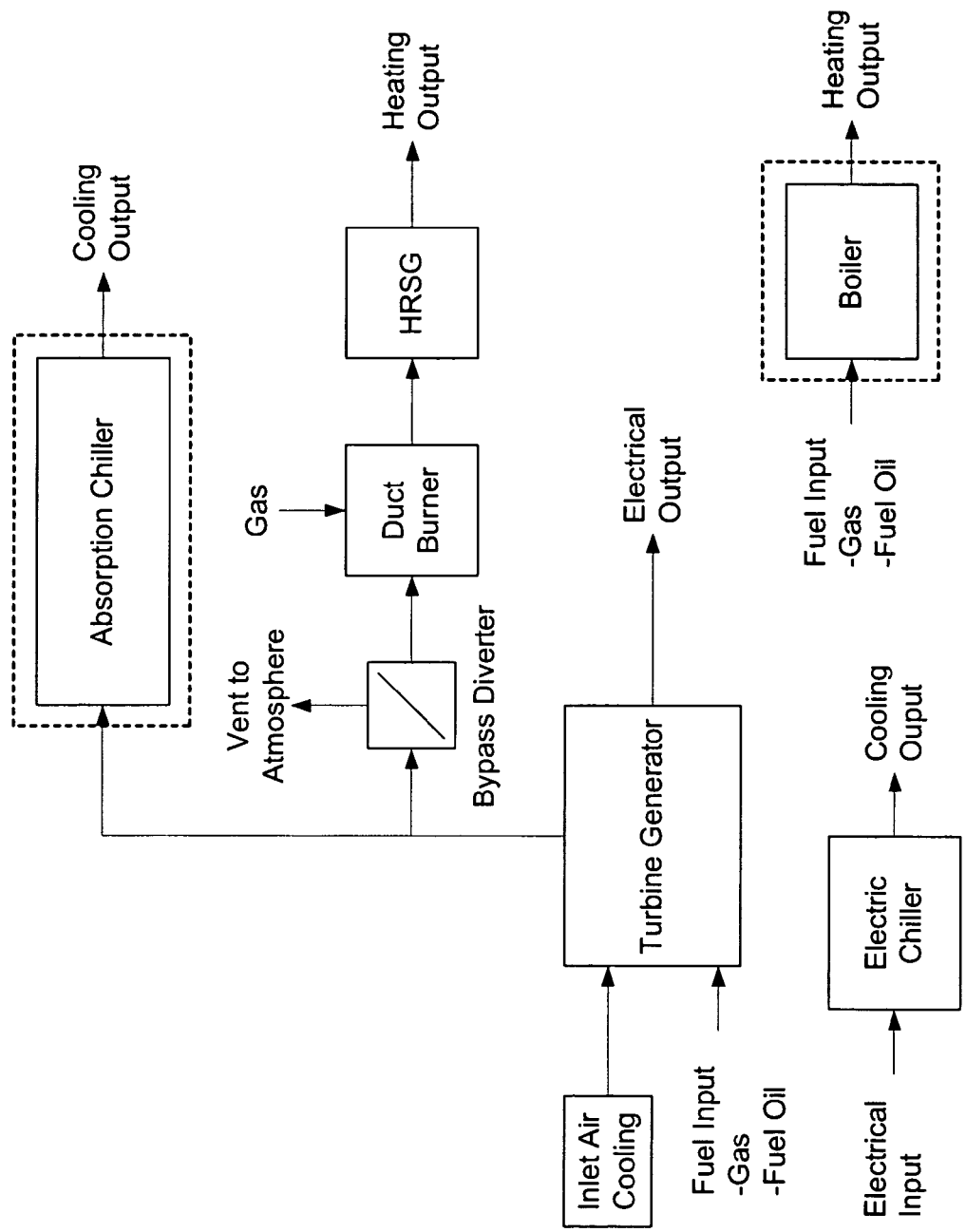

FIGS. 5A-5C illustrate operation during three cooling priority operational strategies. FIG. 5A illustrates a cooling priority with full turbine and duct burner preference. For this strategy, the turbine generator is operated at top output, the absorption chiller is allowed to use as much of the exhaust from the turbine generator as is needed to meet the cooling load, and the remaining exhaust is provided to the HRSG via the duct burner for meeting heating load. Higher priority is given to the absorption chiller, over the HRSG. If the absorption chiller fails to provide sufficient cooling output, the electric chiller may also be used. If the amount of exhaust available to the HRSG is insufficient to meet the heating load, the prioritization calls for the duct burner to fire as needed. If the duct burner firing cannot meet the heating load, the boiler is engaged to make up the difference. This mode may be cheapest at times with large cooling loads, and high RTP relative to the price of fuel for the turbine generator.

FIG. 5B illustrates a cooling priority with a full turbine and boiler preference mode. The absorption chiller again controls how much exhaust it receives, and whatever exhaust is left is available for the HRSG. In contrast to FIG. 5A, the boiler is preferred as a supplementary heating source if the HRSG is unable to meet the heating load, rather than the duct burner. Again, low fuel prices relative to RTP during a period of high cooling needs would intuitively support adoption of this approach. The choice between the method of FIGS. 5A and 5B can be a function of the operating characteristics of the HRSG, duct burner, and boiler.

FIG. 5C illustrates a cooling priority with reduced turbine level and boiler preference. The absorption chiller again is provided with enough exhaust to satisfy the cooling load (or all of the available exhaust, if the cooling load cannot be met using available exhaust), with the HRSG receiving the remainder of the exhaust. The boiler is preferred over the duct burner to supplement heat output. The exhaust from the turbine is used as much as possible, and venting of exhaust is minimized. This approach avoids over-using fuel via the turbine when RTP is low. If RTP prices are low, it may be more expensive to operate the turbine generator at full output than it is to simply buy some electricity, especially if exhaust is not being fully re-used for thermal purposes.

Figure 6A:
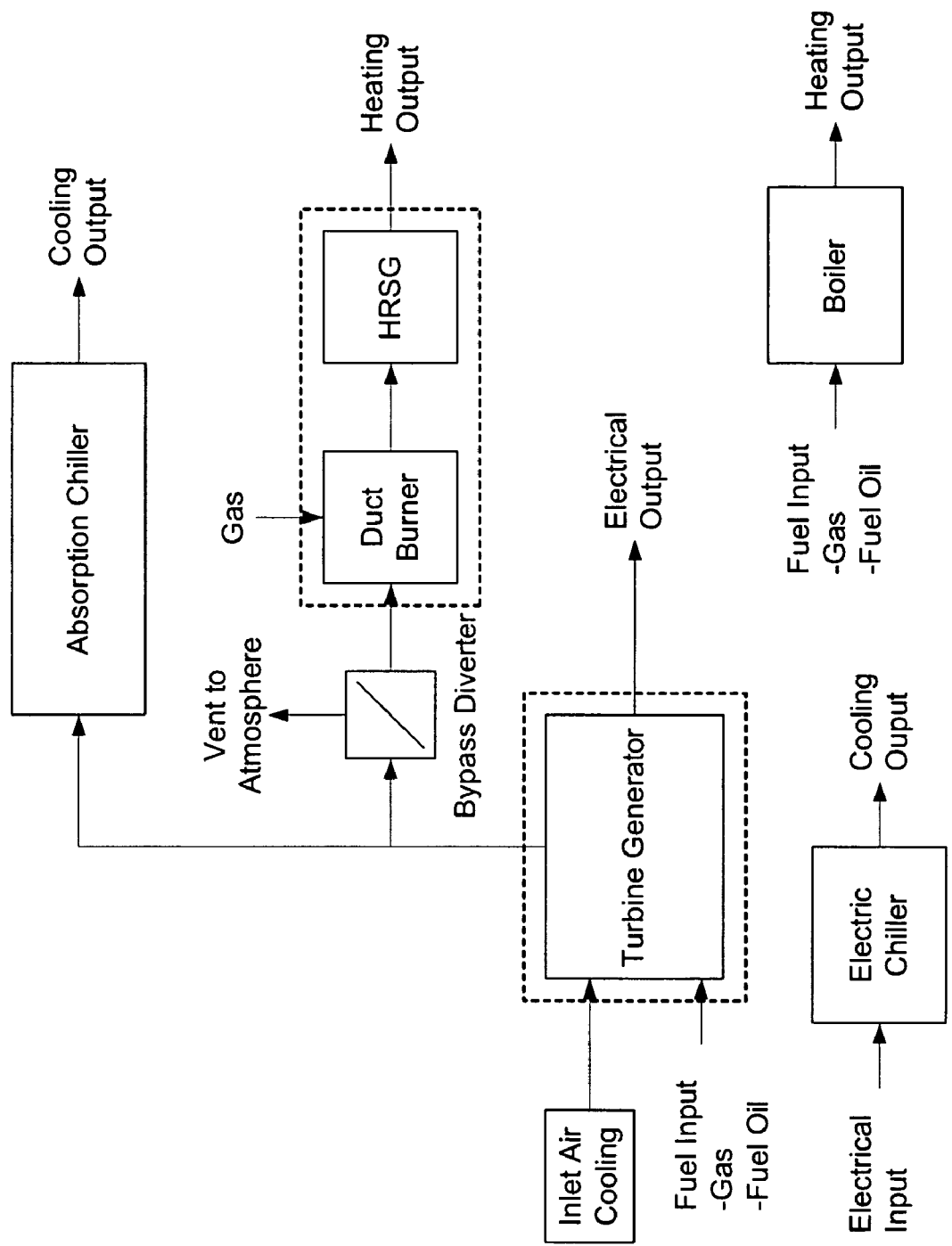
FIGS. 6A-6D illustrate operation during four heating priority operational strategies.

FIGS. 6A-6D illustrate operation during four heating priority operational strategies. FIG. 6A shows a heating priority with full turbine and duct burner preference. In this mode, the turbine generator operates at full output, with the HRSG receiving as much exhaust as it calls for to satisfy the heating load, with the absorption chiller receiving left over exhaust (if any). If additional heating is needed, the duct burner is preferred over the boiler. If additional cooling is needed, the electric chiller is used. This approach may be used during periods of high heating and relatively low cooling loads, when the RTP is high and fuel is high priced. With high RTP, it may prove economical to operate the turbine generator at full capacity even with high fuel costs, since the turbine generator exhaust is re-used by other components.

Figure 6B:
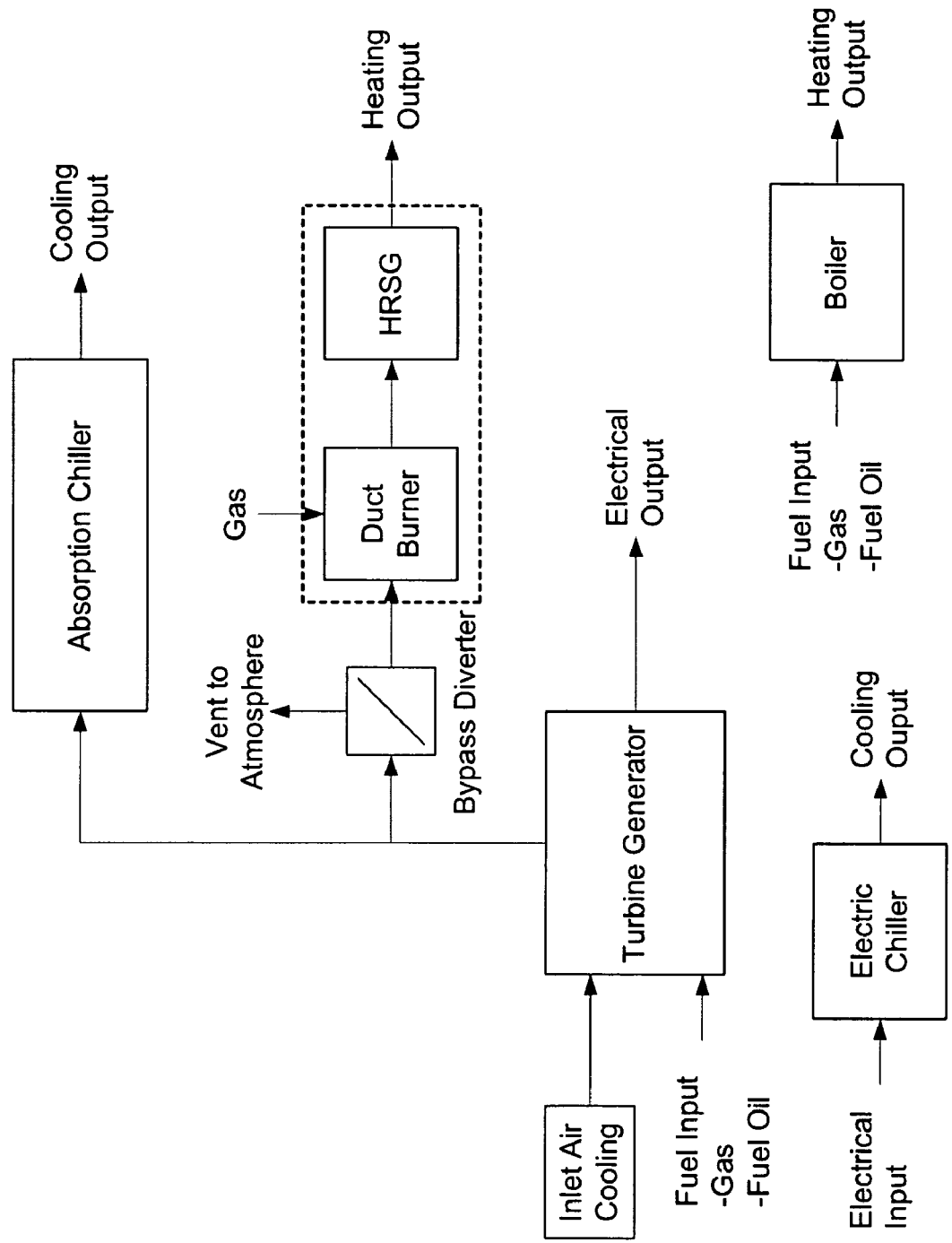

FIG. 6B is a heating priority with reduced turbine and duct burner preference. This mode is similar to that of FIG. 6A except that the turbine generator may be operated below maximum output. Thermal loads are met using the turbine exhaust, with the HRSG receiving exhaust first and the absorption chiller having secondary priority in its share of the turbine exhaust. The turbine is set such that its exhaust meets the thermal loads via the absorption chiller and HRSG, and exhaust venting is minimized. Given moderate fuel costs, with low RTP, this method may be selected to avoid overusing fuel for electricity when electricity is cheap.

Figure 6C:
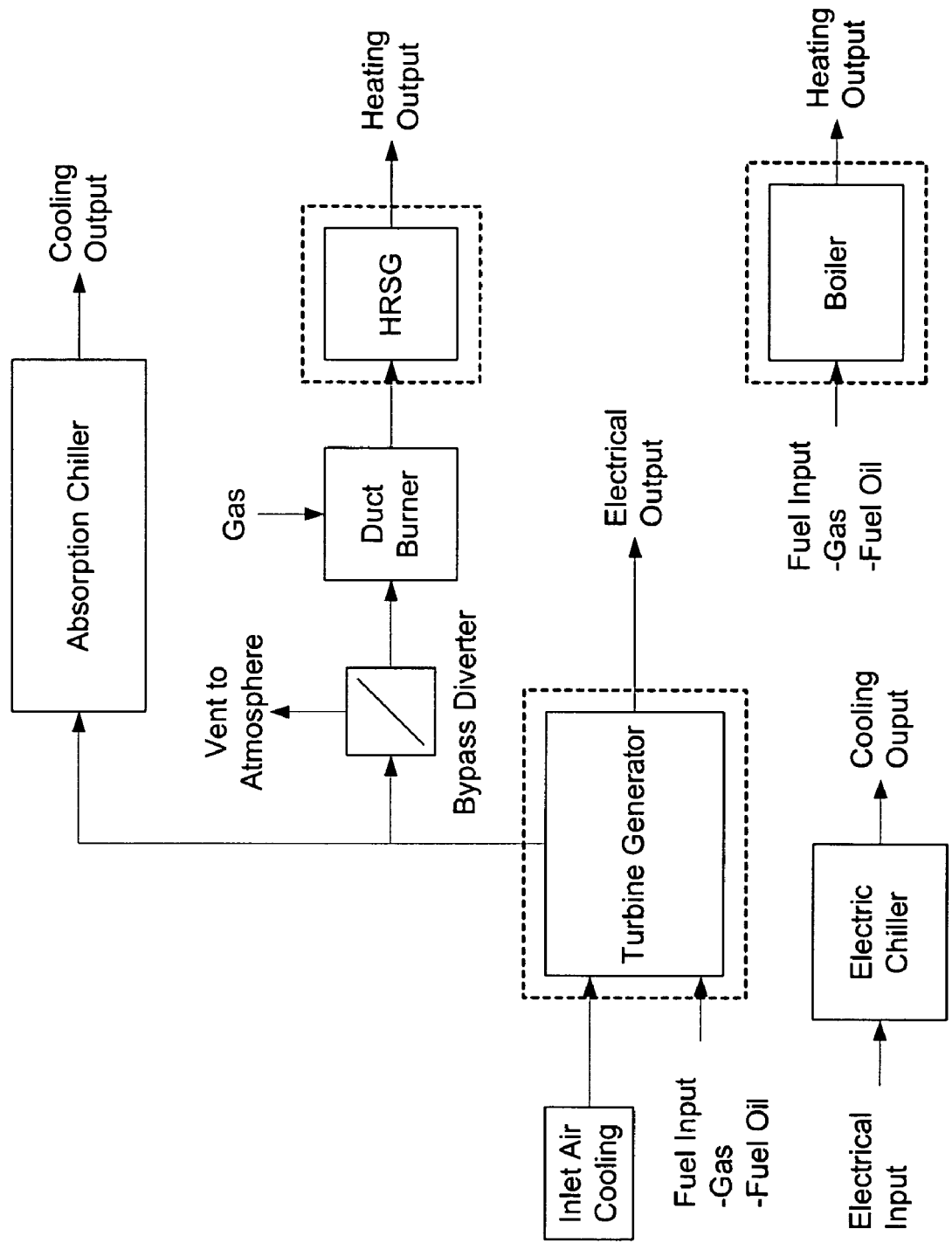

FIG. 6C shows a heating priority with full turbine and boiler preference. The turbine generator is operated at full output, with the HRSG being the primary supplier for the heating load and any exhaust left over used by the absorption chiller. The boiler is preferred to supplement the HRSG output over the duct burner. This approach may be used during high heating, low cooling load periods, with the RTP high and the price of fuel being high as well.

Figure 6D:
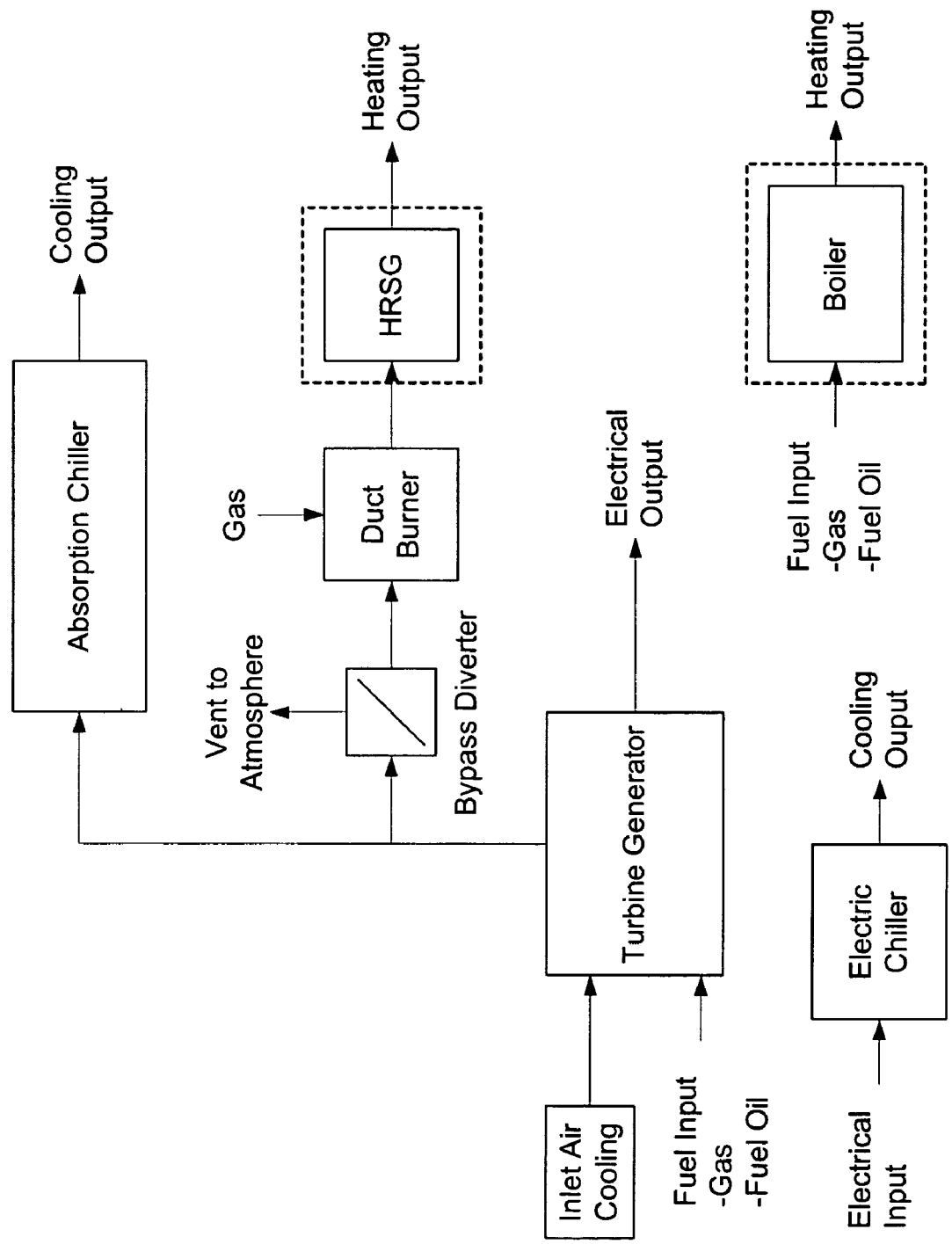

FIG. 6D shows a heating priority with reduced turbine and boiler preference. The turbine generator is operated at a level assuring that sufficient exhaust is provided for the HRSG (which has first option of receiving exhaust) and the absorption chiller to meet thermal needs. However, rather than operating the turbine generator at full capacity and venting excess exhaust, the turbine generator is operated at a reduced level to minimize venting of exhaust. This mode may be used when thermal loads are low with low RTP prices and moderate fuel prices.

Figure 7A:
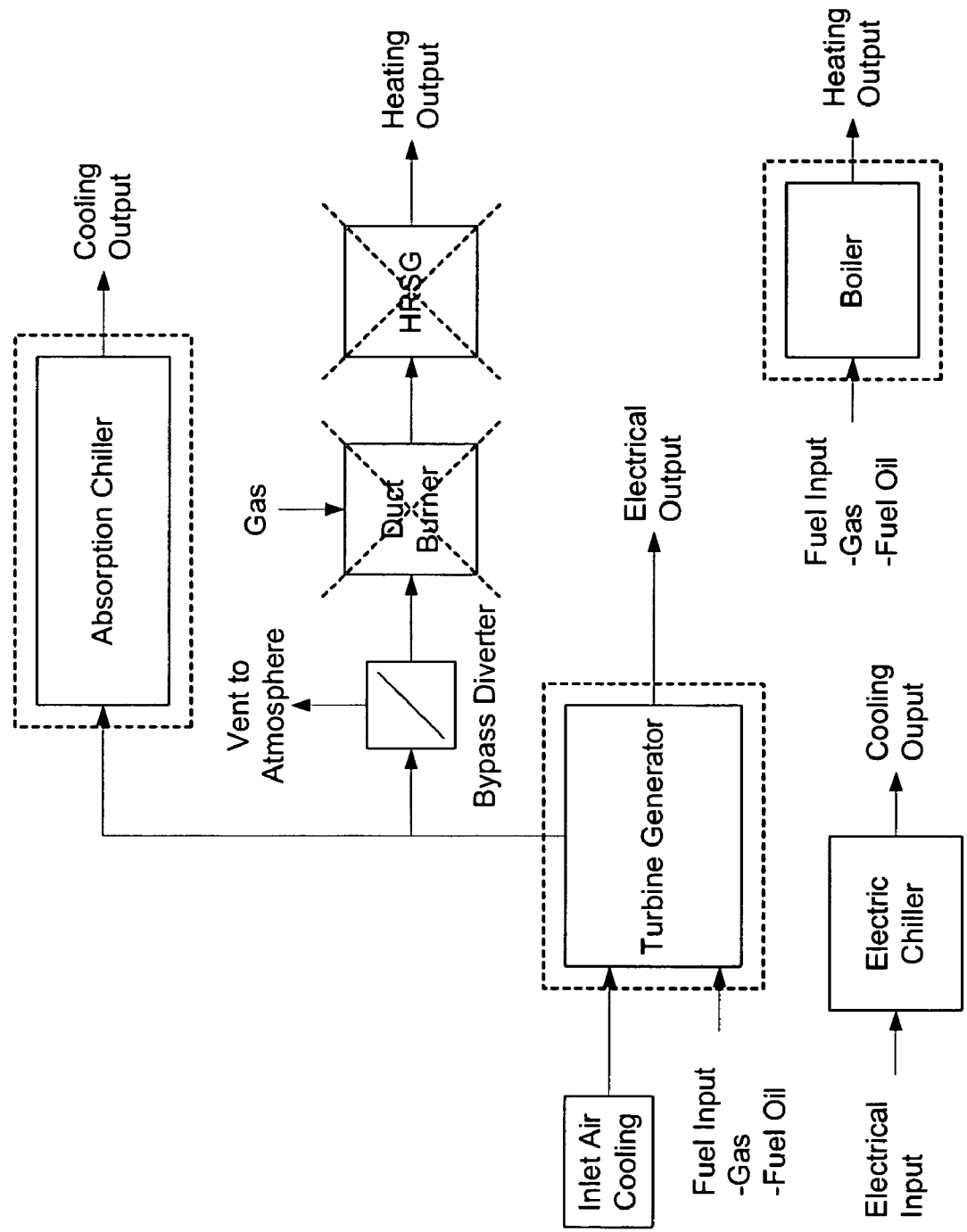
FIGS. 7A-7B illustrate operation during two cooling load following operational strategies.
Figure 7B:
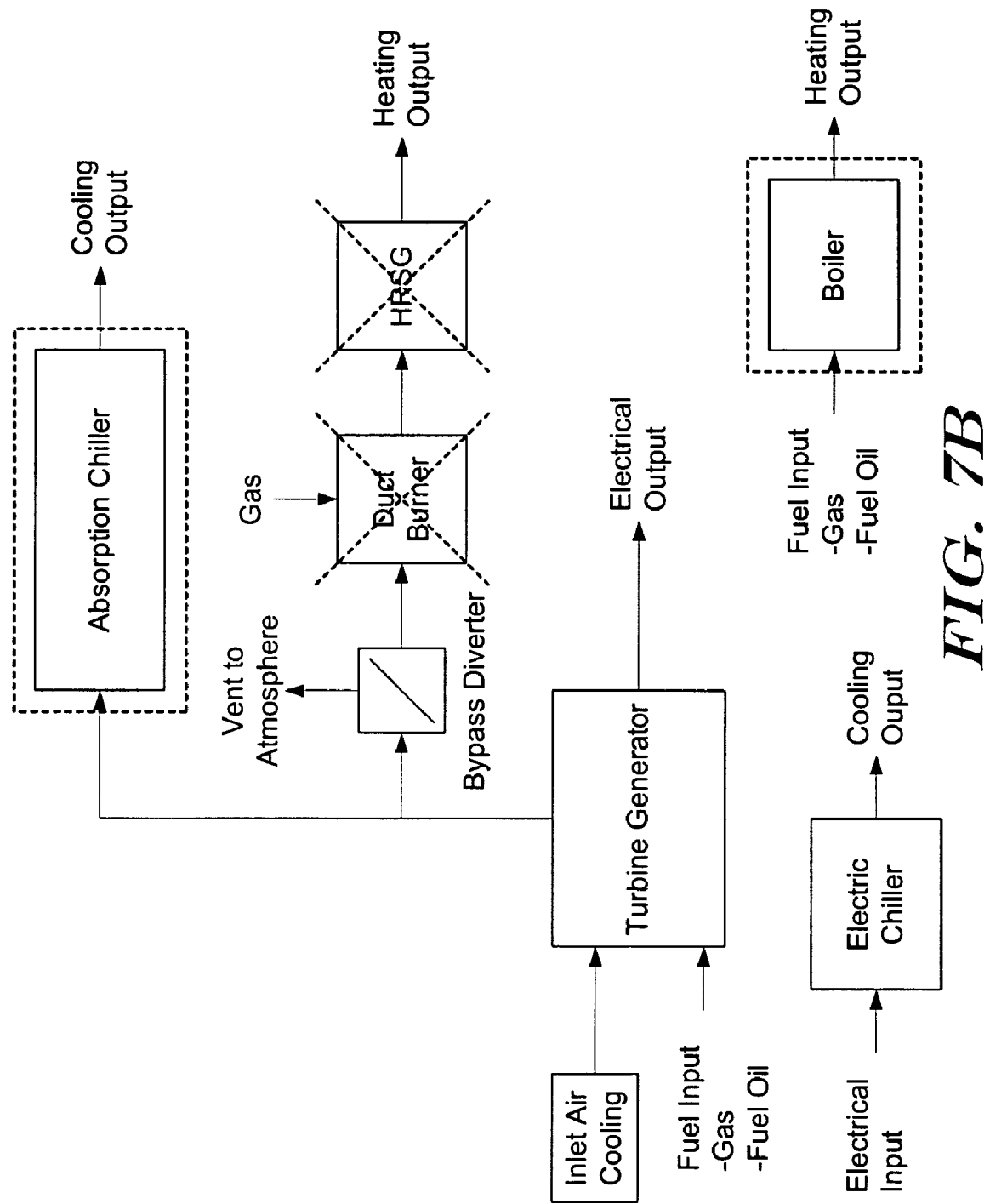

FIGS. 7A-7B illustrate operation during two cooling load following operational strategies. FIG. 7A shows a cooling only with full turbine approach. In this mode, the generator is placed at full output, supplying exhaust to the absorption chiller, while the HRSG (and hence the duct burner) are disabled. Unused exhaust is vented, rather than used by the HRSG. Intuitively, this mode may apply when high cooling and very low heating loads are anticipated. If the heating load is too low to allow safe/stable operation of the HRSG, this mode may be selected. This approach would most likely apply when there are high RTP prices and moderate fuel prices.

FIG. 7B shows a cooling only with reduced turbine mode. The turbine is operated at less than full output, and all exhaust is used either at the absorption chiller or is vented, with the HRSG being disabled. The vented exhaust is minimized by modulating (reducing) the turbine generator output. If the heating load is anticipated to be too low to allow safe/stable operation of the HRSG, this mode may be used. This approach may be used when high cooling and very low heating loads occur, when RTP is low and fuel costs are moderate to high. It may be noted that FIGS. 7A-7B assume that the boiler has a lesser minimum capacity than the HRSG, which may not always be the case.

Figure 8A:
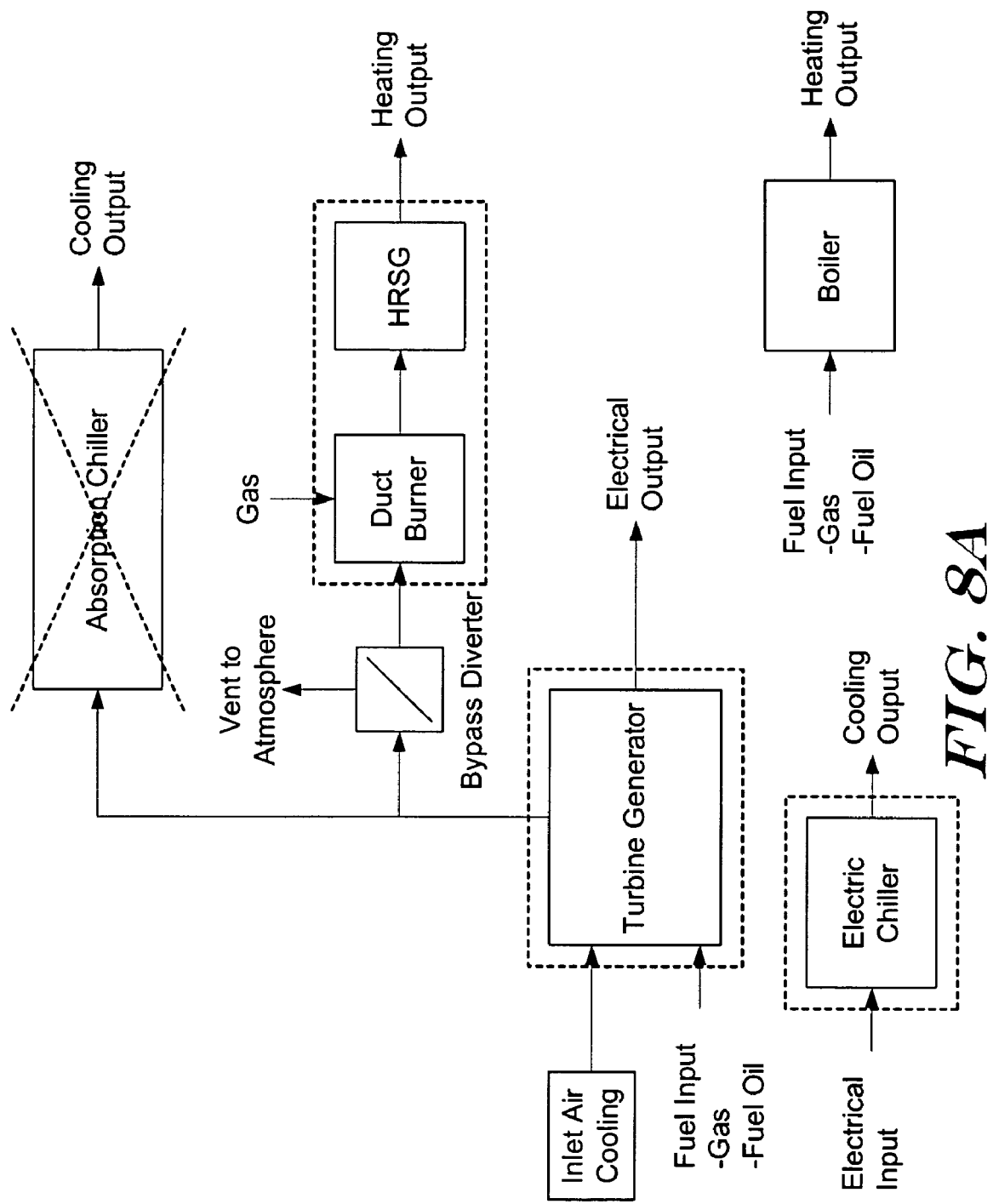
FIGS. 8A-8C illustrate operation during three heating load following operational strategies.
Figure 8B:
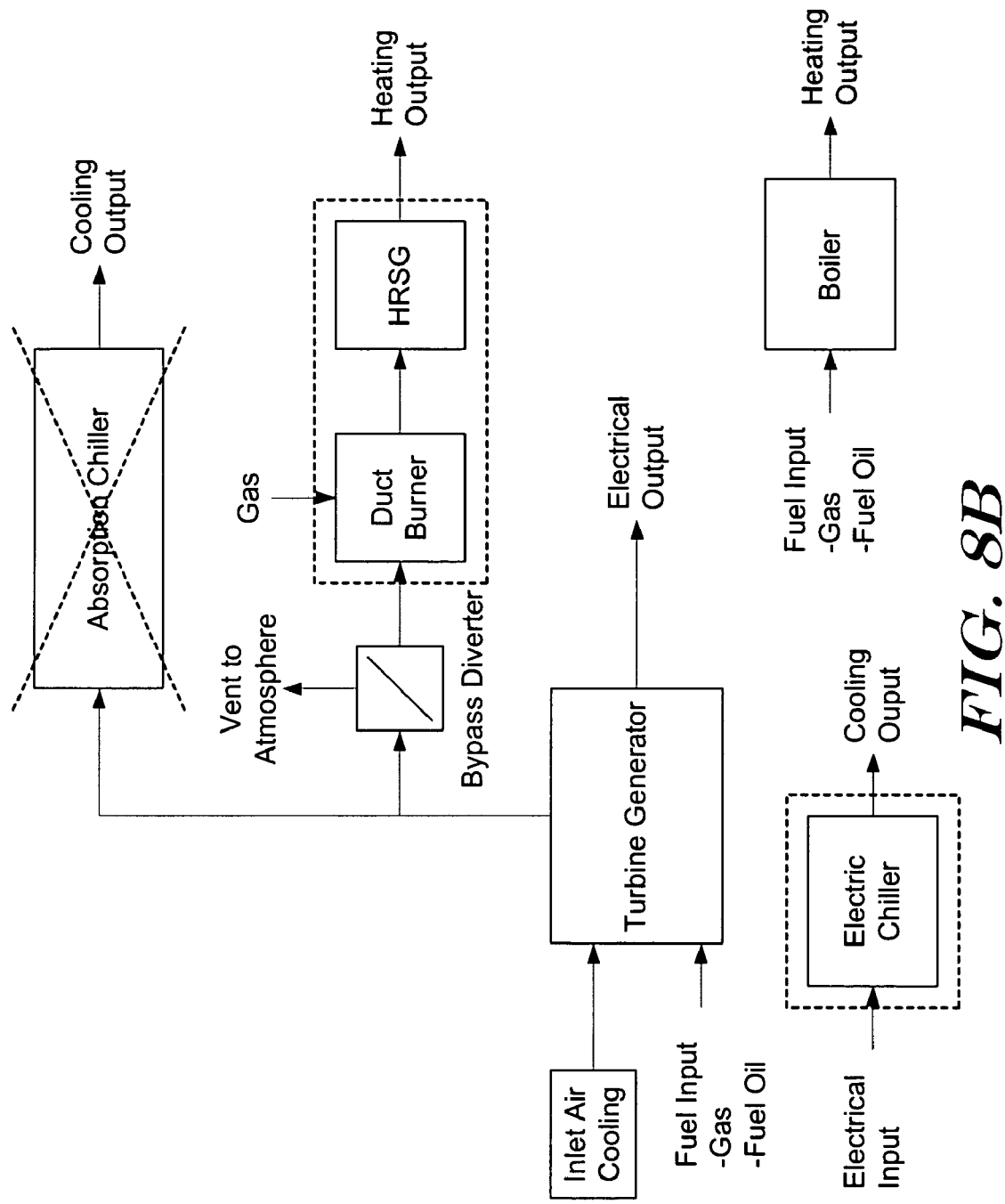
Figure 8C:
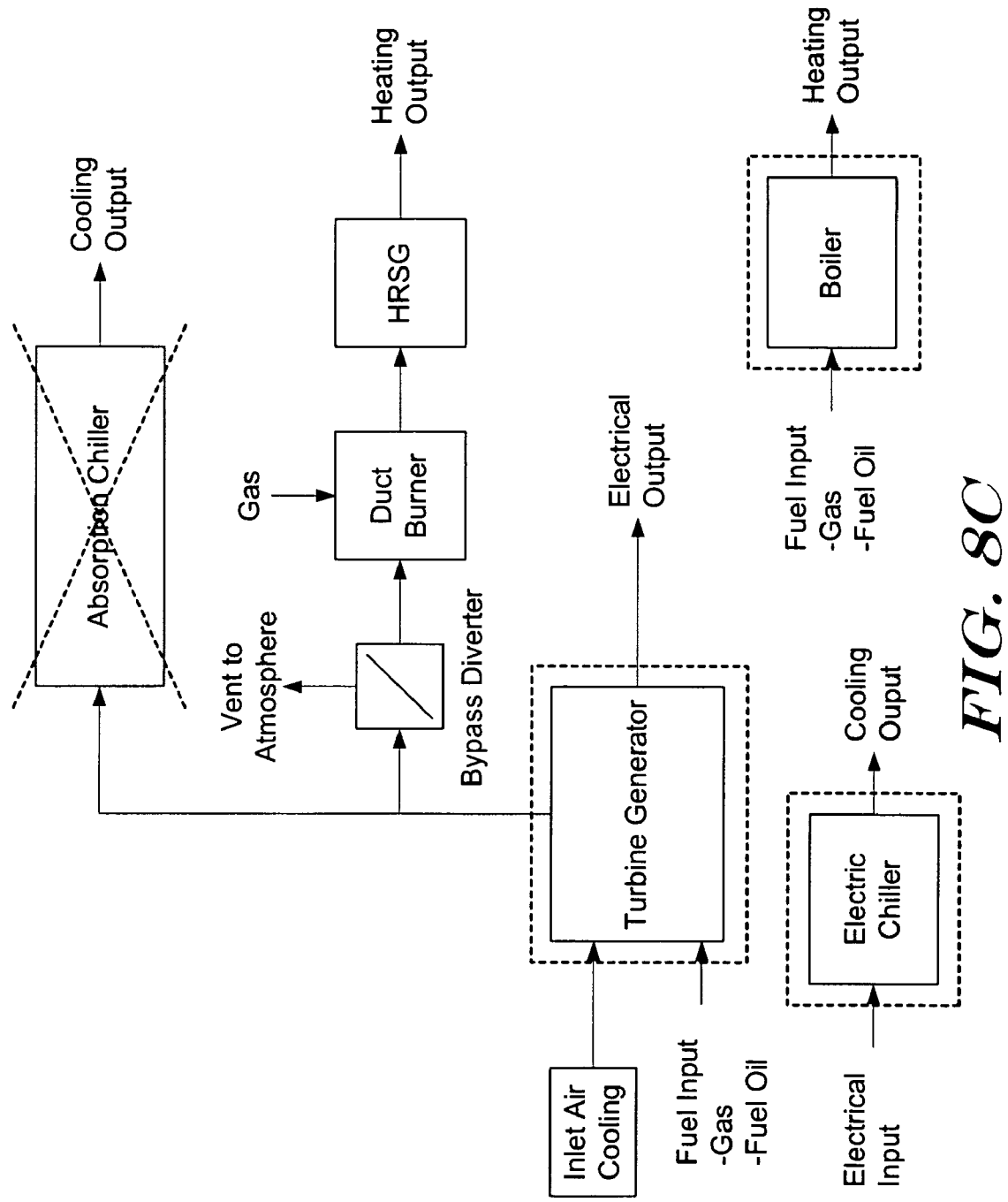

FIGS. 8A-8C illustrate operation during three heating load following operational strategies. FIG. 8A shows a heating only with full turbine and duct burner preference. Here, the turbine is operated at full output, with exhaust going either to the HRSG or being vented. If more heat output is needed, the duct burner is preferred over the boiler. The absorption chiller is disabled because the anticipated cooling load would be less than the minimum output for the absorption chiller, and the electric chiller is used instead to meet cooling loads. The model of FIG. 8A may be used, for example, during periods of high heat loads, with very low cooling loads, when RTP is high and fuel prices are moderate.

FIG. 8B shows a heating only with reduced turbine and duct burner preference. Exhaust from the turbine generator is either used at the HRSG or is vented, with the absorption chiller disabled due to cooling loads that are too low to allow safe operation. The turbine generator output is modulated/reduced to limit vented exhaust. Again, the duct burner is preferred over the boiler. This mode is intuitively more used under moderate/high heat loads, with very low cooling loads, at times when the RTP is low and fuel prices are moderate to high.

FIG. 8C illustrates heating only with full turbine and boiler preference. Here, turbine exhaust is routed only to the HRSG, with the absorption chiller unused. Any extra exhaust is vented. The boiler is preferred over the duct burner to supplement HRSG output, when needed. This approach would be optimal for periods corresponding to high heating loads combined with very low cooling loads, when RTP is high and fuel prices are moderate.

It should be noted that the intuitive situations where each approach may be chosen are provide to illustrate what one might expect during operation. The present methods entail calculating the costs for a number of methods and then selecting the cheapest solution, rather than selecting a method in advance under certain conditions. Thus, a certain method is chosen because it is cheapest, not because conditions indicate the method.

In another illustrative embodiment, the above methods of selecting cost strategies are further used to model and estimate desirable CHP component sizes. As shown in the block diagram of an illustrative example of FIG. 9, when planning a CHP system, a number of factors, including likely load profiles and likely future fuel/power rate structures are be modeled. Using models of the anticipated load profiles and rate structures, a plan CHP system can be modeled by adding in profiles for various CHP system components from among those available. For example, given a number of available turbine generators, boilers, absorption coolers, heat recovery steam generators, and electric chillers, components may be selected. Next, a plurality of operational strategies can be applied to first select operational strategies under anticipated conditions, and then to estimate costs associated with the operational strategies. A total cost for the CHP system having the selected components can be estimated. The method may then be repeated until several combinations of components have been modeled, and a lowest cost system design may then be selected.

Figure 9:
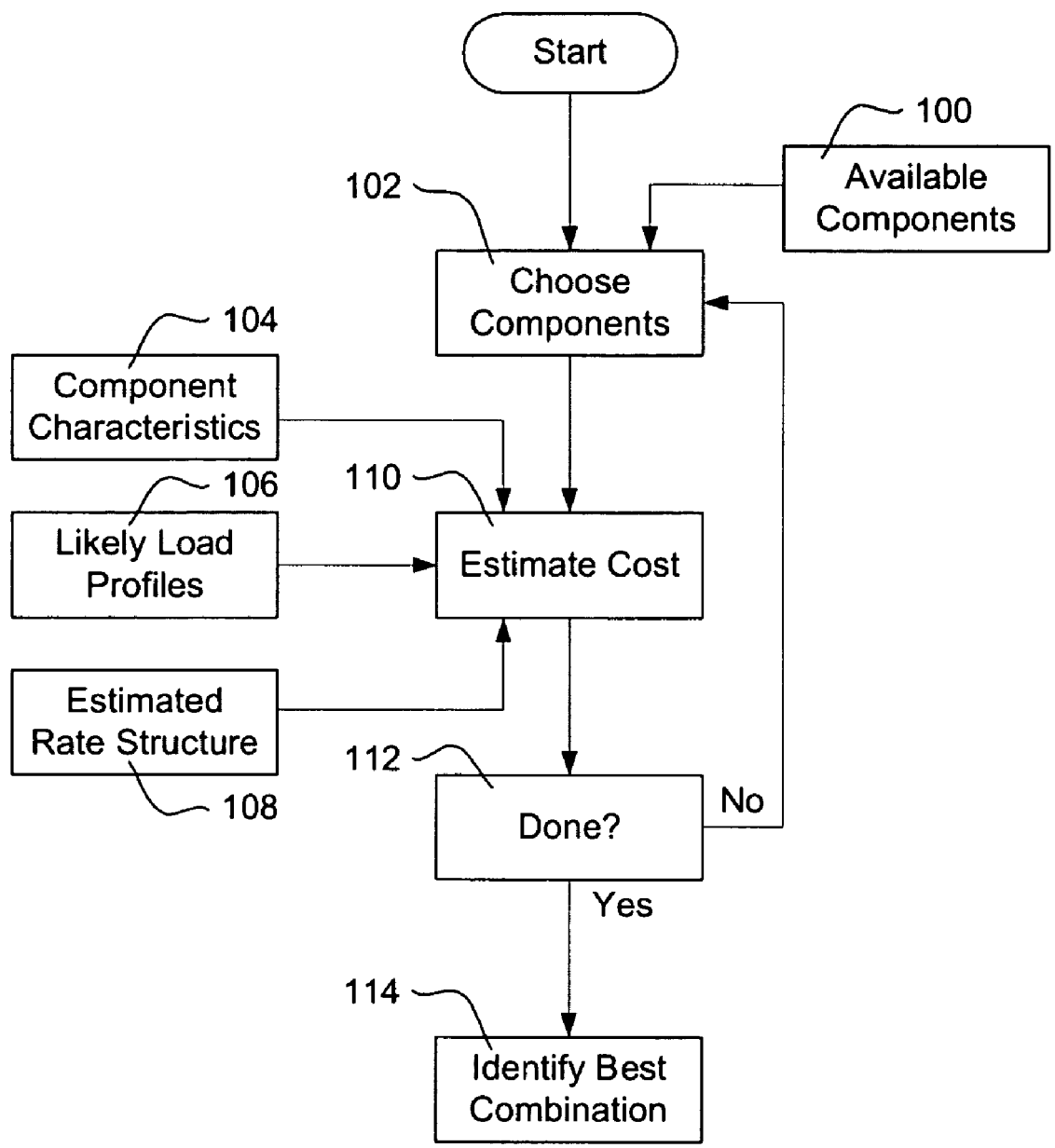
FIG. 9 illustrates a block diagram for another illustrative embodiment.

For example, the embodiment shown in FIG. 9 operates as follows. From a start block, the method takes from a number of available components 100 and a first combination of such components is chosen, as shown at 102. This may include selection of a turbine generator, a boiler, an absorption cooler, a heat recovery steam generator, and/or an electric chiller, from a number of available models, types, and/or sizes. With the components chosen at 102, the method then incorporates the component characteristics 104, likely load profiles 106, and an estimated rate structure 108 to estimate costs as shown at 110. It is then determined whether the method is done, as shown at 112, by taking consideration of what combinations of components have been analyzed. If the method is not done checking a desired set of combinations, the method recycles and goes back to choosing components 102 and selects a different combination of components. Once the method is done, the best combination is chosen. In some embodiments, the "best" combination is the most robust combination—a combination that provides a margin of safety assuring that worst case scenario loads can be met with ease. In other embodiments, the "best" combination is the cheapest in terms of operating efficiency or costs of operation In some embodiments, all available combinations are checked, while in other embodiments, less than all combinations are analyzed. For example, combinations including a relatively small absorption chiller and a relatively small electric chiller may be eliminated without estimating their cost if the combination of chillers is incapable of meeting worst case scenario cooling needs. This part of the method may be accounted for in the step of choosing components 102 by including a check on which combinations are plausible from among those that may be picked from the available components 100.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A controller for controlling the source of electric power for a cogeneration system, the cogeneration system including a local generator for generating local electric power, a fuel source, connections to an external electric power source for receiving externally generated power, and a number of operational components including heating and/or cooling devices, the controller configured to perform the steps of:
    estimating future load conditions for thermal and electric power loads;
    performing a first analysis using a first operational strategy to generate a first future cost figure for the cost of operating the cogeneration system, wherein the first operational strategy includes generating at least some local electric power for powering the cogeneration system;
    performing a second analysis using a second operational strategy to generate a second future cost figure for the cost of operating the cogeneration system, wherein the second operational strategy includes receiving at least some externally generated electric power for powering the cogeneration system;
    comparing the first future cost figure to the second future cost figure; and
    when the first future cost figure is different than the second future cost figure, selecting the operational strategy corresponding to a lesser of the first future cost figure and the second future cost figure.

2. A controller as in claim 1 wherein the controller is configured to perform the step of performing the first cost analysis by including consideration of usage costs for the operational components of the cogeneration system.

3. A controller as in claim 1 wherein the controller is configured to perform the step of estimating future load conditions using a method including the steps of:
    using data related to the operational components of the cogeneration system; and
    using data related to environmental conditions in the vicinity of the cogeneration system.

4. A controller as in claim 1 wherein the controller is configured for use in a cogeneration system that includes a turbine generator as a local generator, a boiler, an absorption cooler, a heat recovery steam generator, and an electric chiller.

5. A controller as in claim 4 wherein the controller is configured to perform analysis using at least:
    an operational strategy in which the preferred cooling source is the absorption chiller;
    an operational strategy in which the preferred cooling source is the electric chiller.

6. A controller as in claim 4 wherein the controller is configured to perform analysis using at least:
    an operational strategy in which the preferred electricity source is the turbine generator; and
    an operational strategy in which the preferred electricity source is the external electric power source.

7. A controller as in claim 1 wherein the step of estimating future load conditions for thermal and electric power loads comprises:
    accessing a database of historical load conditions; and
    estimating future load conditions for the next hour.

8. A cogeneration system comprising a number of operational components adapted to provide heating, cooling, and power, and a controller as recited in claim 1, the controller coupled to the operational components to provide control signals thereto.

9. A method of operating a cogeneration system for providing electric power and thermal control to a facility, the cogeneration system including a number of operational components configured to provide power and one or more of cooling and heating, the method comprising:
    estimating future load conditions for thermal and electric power loads for the cogeneration system;
    performing a first analysis using a first operational strategy to generate a first future cost figure for the cost of operating the cogeneration system, wherein the first operational strategy includes using at least some locally generated electric power for powering the cogeneration system;
    performing a second analysis using a second operational strategy to generate a second future cost figure for the cost of operating the cogeneration system, wherein the second operational strategy includes receiving at least some externally generated electric power for powering the cogeneration system;
    comparing the first future cost figure to the second future cost figure; and
    when the first future cost figure is different than the second future cost figure, selecting the operational strategy corresponding to a lesser of the first future cost figure and the second future cost figure.

10. The method of claim 9 wherein the steps of performing analyses using the first and second operational strategies further include considering usage costs of operational components of the cogeneration system.

11. The method of claim 9 wherein the step of estimating future load conditions comprises:
    accessing a database of historical load conditions; and
    estimating future load conditions for a next time period.

12. The method of claim 9 wherein the steps of performing analyses using the first and second operational strategies comprise:
    using data related to fuel and electricity prices;
    using data related to the operational components; and
    using data related to environmental conditions in the vicinity of the cogeneration system.

13. The method of claim 9 wherein the method further comprises sending control signals to a turbine generator used as a local generator, a boiler, an absorption cooler, a heat recovery steam generator, and an electric chiller.

14. The method of claim 13 wherein:
    the first operational strategy is one in which the preferred cooling source is the absorption chiller; and
    the second operational strategy is one in which the preferred cooling source is the electric chiller.

15. The method of claim 13 wherein:
    the first operational strategy is one in which the preferred electricity source is the turbine generator; and
    the second operational strategy is one in which the preferred electricity source is the external electric power source.

16. A method of operating a cogeneration system for providing electric power and thermal control to a facility, the method comprising:
- observing prices for a plurality of power and/or fuel sources;
- observing likely electric power and thermal load conditions for the facility;
- performing a first cost analysis using a first strategy for operation of the cogeneration system, wherein the first strategy includes using at least some locally generated electric power for powering the cogeneration system;
- performing a second cost analysis using a second strategy for operation of the cogeneration system, wherein the second strategy includes receiving at least some externally generated electric power for powering the cogeneration system; selecting an operational strategy in light of the first and second cost analyses.

17. The method of claim 16 further comprising configuring the cogeneration system for the selected operational strategy.

18. The method of claim 17 wherein the cogeneration system includes:
- a gas turbine;
- an absorption chiller; and
- a heat recovery steam generator; wherein the step of configuring the cogeneration system includes distributing load levels for the gas turbine, the absorption chiller, and the heat recovery steam generator.

19. The method of claim 18 wherein the cogeneration system is coupled to an electric grid, wherein the step of configuring the system includes modulating power drawn from the electric grid.

20. The method of claim 16 wherein the steps of performing the first cost analysis and the second cost analysis include consideration of the usage costs of one or more operational components of the cogeneration system.

21. A method comprising periodically performing the method of claim 16.

22. The method of claim 21 wherein the step of periodically performing occurs hourly.

* * * * *